(12) United States Patent
Schlichting

(10) Patent No.: US 11,818,985 B2
(45) Date of Patent: Nov. 21, 2023

(54) BALE WRAPPING APPARATUS

(71) Applicant: AGCO International GmbH, Neuhausen (CH)

(72) Inventor: Malte Cornelius Schlichting, Hillerse (DE)

(73) Assignee: AGCO International GmbH, Neuhausen (CH)

( * ) Notice: Subject to any disclaimer, the term of this patent is extended or adjusted under 35 U.S.C. 154(b) by 639 days.

(21) Appl. No.: 16/709,175

(22) Filed: Dec. 10, 2019

(65) Prior Publication Data

US 2020/0178469 A1 Jun. 11, 2020

(30) Foreign Application Priority Data

Dec. 10, 2018 (GB) .................................... 1820057

(51) Int. Cl.
*A01F 15/07* (2006.01)
*A01F 15/08* (2006.01)

(52) U.S. Cl.
CPC ...... *A01F 15/0715* (2013.01); *A01F 15/0883* (2013.01); *A01F 2015/076* (2013.01); *A01F 2015/077* (2013.01)

(58) Field of Classification Search
CPC ... A01F 15/0715; A01F 15/074; A01F 15/076
See application file for complete search history.

(56) References Cited

U.S. PATENT DOCUMENTS

| 2004/0182043 A1 | 9/2004 | Viaud et al. |
| 2010/0288140 A1 | 11/2010 | Smith et al. |
| 2014/0158000 A1* | 6/2014 | Kraus ..................... A01F 15/08 100/99 |
| 2017/0276623 A1* | 9/2017 | MacNeill ............ A01F 15/0825 |

FOREIGN PATENT DOCUMENTS

| DE | 10011158 A1 | 9/2001 |
| EP | 1 053 673 A1 | 11/2000 |
| EP | 1 396 187 A2 | 3/2004 |
| EP | 2656726 A1 | 10/2013 |
| EP | 3 147 229 A1 | 3/2017 |
| WO | 93/12643 A1 | 7/1993 |
| WO | 2014/076271 A1 | 5/2014 |

OTHER PUBLICATIONS

European Patent Office, Search Report for related EP Patent Application No. 19205831.1, dated Apr. 9, 2020.
UK Intellectual Property Office, Search Report prepared for UK priority Application No. GB1820057.6 , dated Jun. 6, 2019.

* cited by examiner

*Primary Examiner* — Chelsea E Stinson

(57) ABSTRACT

A baling apparatus including a bale forming chamber in which an agricultural bale is formed, wrapped and subsequently released. The baling apparatus also includes a support extending adjacent the bale forming chamber, the support incorporating a plurality of sensors arranged upon the support, wherein the sensors are adapted to measure a surface property of at least one surface of the bale. Since the surface property of an unwrapped bale will differ from the surface property of a wrapped bale, the baling apparatus can detect whether the wrapping material is sufficiently wrapped around the formed bale to release of the bale without the bale falling apart.

16 Claims, 5 Drawing Sheets

BALE WRAPPING APPARATUS

FIELD OF THE INVENTION

The present invention relates to an improved apparatus and method for wrapping of an object such as an agricultural bale within a chamber. In particular the present invention relates to the wrapping or binding of agricultural bales within a baling apparatus and monitoring whether the agricultural bale is properly bound or wrapped. The invention has particular advantages when used in a combination baler wrapper apparatus.

BACKGROUND TO THE INVENTION

It is known to provide an agricultural bale forming and wrapping apparatus in which loose crop material is gathered from a ground surface and loaded into a bale forming chamber where the loose crop material is formed into an agricultural bale. While in the bale forming chamber, a circumferential surface of the agricultural bale is wrapped or bound by a wrapping material. Prior to release of the agricultural bale from the bale forming chamber the wrapping material is severed. In the absence of such wrapping or binding of the bale surface in the bale forming chamber the released agricultural bale would fall apart.

Due to various circumstances, the circumferential surface of the bale in the bale forming chamber might not be properly wrapped or not wrapped at all. This can result in an improperly wrapped or bound bale being released and the agricultural bale falling apart during release.

It is desired to automatically detect this undesired event such that suitable measures can be taken before the agricultural bale is released from the bale forming chamber.

BRIEF DESCRIPTION

According to a first aspect of the invention, a baling apparatus comprises a bale forming chamber in which an agricultural bale is formed and subsequently released, a release apparatus to control release of the agricultural bale from the bale forming chamber and a wrapping apparatus for introducing a wrapping material into the bale forming chamber in order that the agricultural bale once formed is wrapped on at least one surface by the wrapping material, characterised in that the baling apparatus further comprises a support extending adjacent the bale forming chamber, the support incorporating a plurality of sensors arranged upon the support, wherein the sensors are adapted to measure a surface property of the at least one surface.

Since the surface property of the surface of an unwrapped bale will differ from the surface property of the surface of the wrapped bale, the baling apparatus according to the invention has as an advantage that it can be detected whether the wrapping material is sufficiently wrapped around an agricultural bale to permit release of the agricultural bale.

Preferably the plurality of sensors are moisture sensors and the surface property detected is moisture.

Preferably the plurality of sensors are divided into two groups, with one of the two groups disposed toward either end of the support. More preferably each of the two groups of sensors comprises two sensors.

Preferably, the baling apparatus further includes at least one additional sensor adapted to measure a surface property of an unwrapped surface of the agricultural bale. More preferably, at least one additional sensor is a moisture sensor and the surface property detected is moisture.

Preferably the baling apparatus further includes a control device to control operation of the release apparatus in dependence of signals received from the plurality of sensors. More preferably, the control device control operation of the release apparatus in dependence of signals received from the plurality of sensors and the at least one additional sensor.

According to a second aspect of the invention a baling and wrapping apparatus comprises a baling apparatus according to the first aspect of the invention and a wrapping apparatus.

According to a third aspect of the present invention a method of operation of a baling apparatus according to the first aspect of the invention comprises the steps of gathering loose crop material from a ground surface, transferring the loose crop material to the baling apparatus, forming an agricultural bale, wrapping the agricultural bale within the baling apparatus, measuring a surface property of the agricultural bale using the plurality of sensors, determining from the measurement of the surface property whether the agricultural bale is properly wrapped and determining whether to release the agricultural bale from the baling apparatus.

More preferably, a surface property of the agricultural bale using the at least one additional sensor is measured and compared to the surface property of the agricultural bale measured using the plurality of sensors to determine whether the agricultural bale is properly wrapped and determining whether to release the agricultural bale from the baling apparatus.

According to a fourth aspect of the present invention a method of operation of a baling and wrapping apparatus according to the second aspect of the invention comprises the steps of gathering loose crop material from a ground surface, transferring the loose crop material to the baling apparatus, forming an agricultural bale, wrapping the agricultural bale within the baling apparatus with a first sheet material, measuring a surface property of the agricultural bale using the plurality of sensors, determining from the measurement of the surface property whether the agricultural bale is properly wrapped and determining whether to release the agricultural bale from the baling apparatus to the wrapping apparatus.

More preferably, a surface property of the agricultural bale using the at least one additional sensor is measured and compared to the surface property of the agricultural bale measured using the plurality of sensors to determine whether the agricultural bale is properly wrapped and determining whether to release the agricultural bale from the baling apparatus.

BRIEF DESCRIPTION OF THE DRAWINGS

The invention will now be described, by way of example only, with reference to the accompanying drawings, in which.

DETAILED DESCRIPTION OF SPECIFIC EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel.

Figure 1:
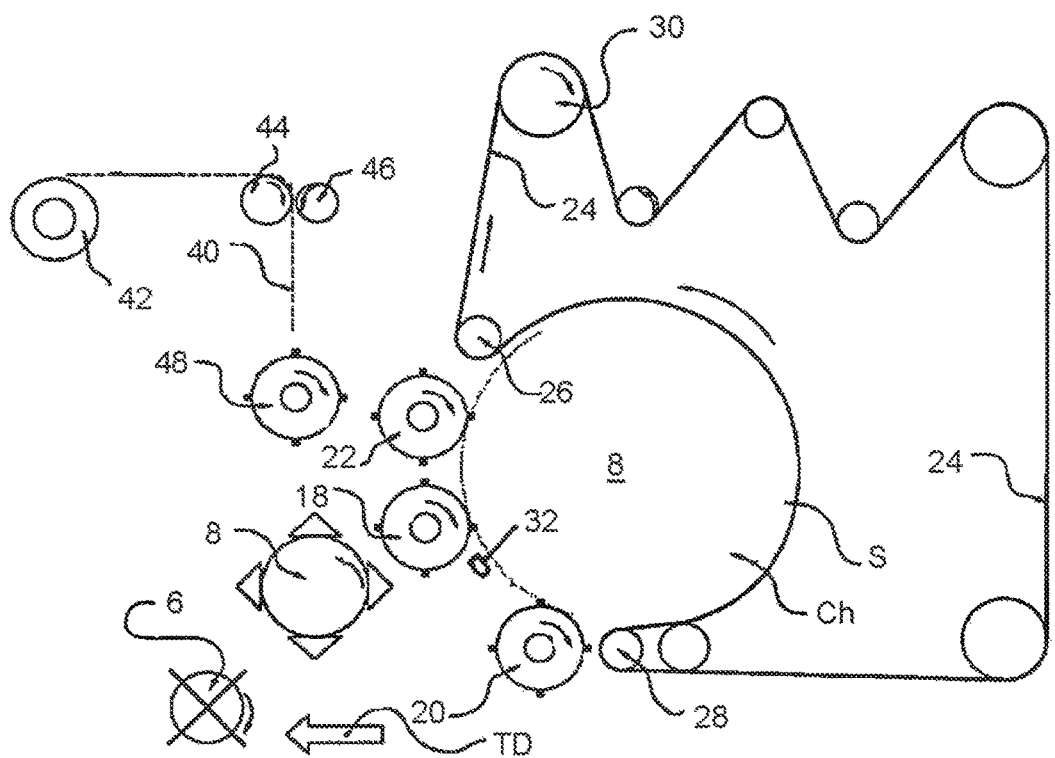
FIG. 1 shows a somewhat schematic view of the elements of a baling apparatus in which the present invention may be used.
Figure 2:
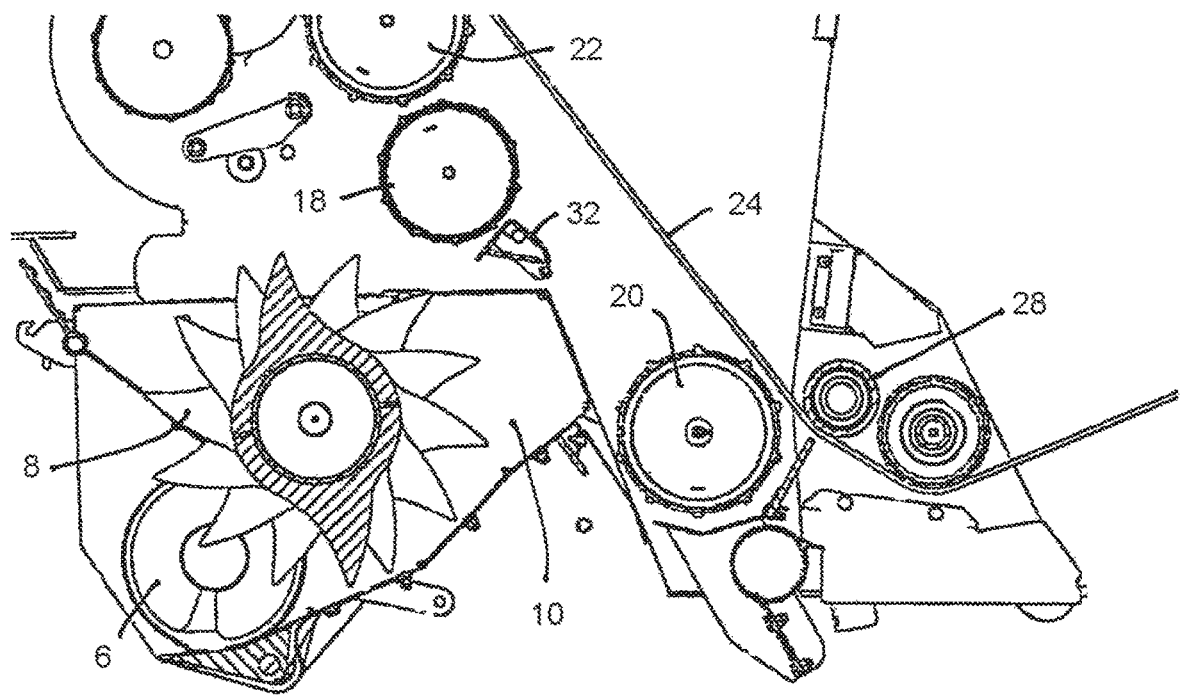
FIG. 2 shows a detail of the baling apparatus of FIG. 1 in which a bale has yet to be formed.
Figure 3:
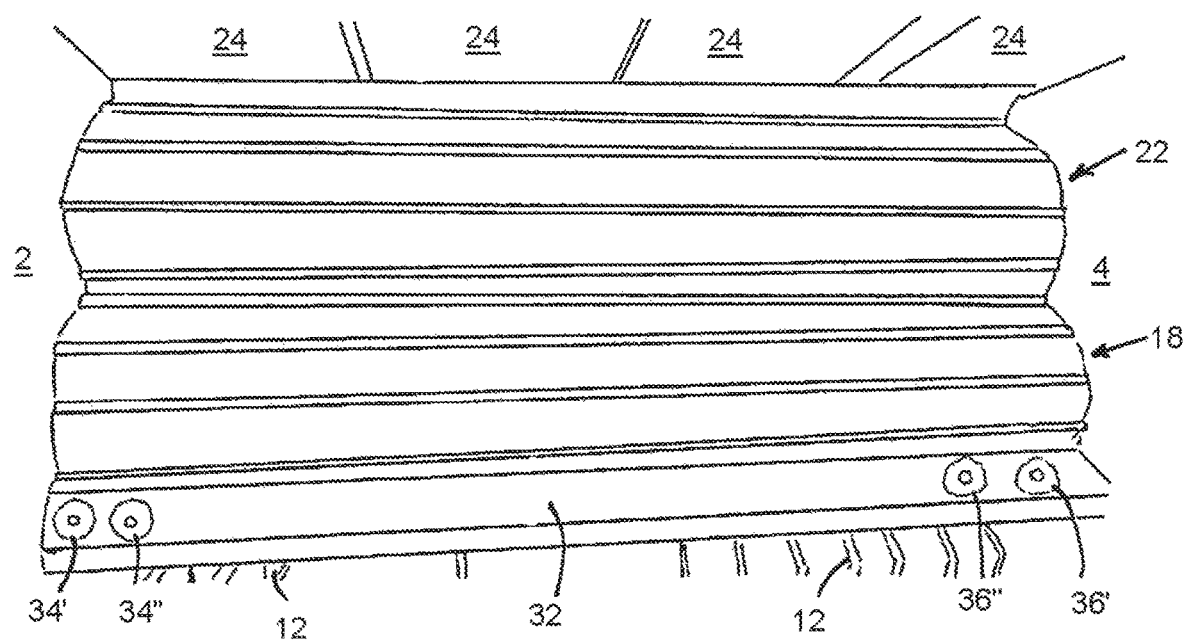
FIG. 3 shows a schematic view of the baling apparatus of FIG. 2 from within the bale forming chamber.

With reference to FIGS. 1 to 3, various parts of a round baler are shown. The round baler travels over a ground surface in a travelling direction TD (in FIG. 1 from right to left) and operates as described below. The round baler is conveniently towed by a towing vehicle, for example a tractor. The round baler may deposit wrapped bales directly onto the ground surface or form part of baler wrapper combination in which the wrapped bale is transferred to a wrapper mechanism associated with the round baler.

The round baler includes a housing having left and right hand sides 2,4. The housing conveniently comprises a fixed front part and a displaceable rear part, the displaceable rear part comprising a pivotal tailgate.

A pick-up unit 6 with several spring-mounted tines picks up loose crop material from the ground surface. A driven conveying rotor 8 with several rigid tines conveys the picked-up loose crop material through a feeding channel 10 towards a crop material inlet of a bale forming chamber. Conveniently, the conveyed crop material is cut into smaller pieces in the feeding channel 10 by a plurality of blades 14 (cf FIG. 3) with which the conveying rotor 8 co-operates.

In the illustrated embodiment, the bale forming chamber Ch is a variable bale forming chamber located within the baler housing. The bale forming chamber Ch is defined between the sides 2,4 of the baler housing in large part by a plurality of parallel endless belts 16 guided around a plurality of rollers. The circumferential surface of the bale forming chamber Ch is defined by first and second driven starter rollers 18,20, a further pressing roller 22, and a plurality of parallel endless pressing belts 24 guided around several deflecting rollers 26,28,30. The first and second starter rollers 18,20 are located adjacent the crop material inlet. The further pressing roller 22 is located above the upper starter roller 22.

The plurality of pressing belts 24 are wound around a plurality of rollers 26, 28, 30. Some of the rollers 26,28 around which the pressing belts 24 are wound are fixed idler rollers while others 30 are moveable to allow for growth of the bale forming chamber and driven to cause the endless belts to rotate (cf arrows of FIG. 1). At least one of the rollers is mounted on a pivotal tensioning arm and tensions the pressing belts 24.

The first upper and second lower starter rollers 18,20 are mounted for driven rotation and are conveniently provided with longitudinal ribs.

In an alternative embodiment (not shown), the baler may be of the fixed chamber variety, where crop material is conveyed through a crop material inlet into a bale forming chamber of fixed dimensions to form a bale before the formed bale is wrapped with a number of layers of wrapping material.

A bar or aerofoil 32 extending across the baler is located adjacent the bale forming chamber Ch, conveniently in the region above the crop material inlet. In the illustrated embodiment the bar or aerofoil 32 is located between the upper starter roller 18 and the feeding channel 10. It will be seen that the location of the bar or aerofoil 32 is chosen so as not to interfere with bale formation.

An upper surface of the bar or aerofoil 32 facing the bale wrapping chamber is provided with a plurality of sensors for measuring a surface property of the formed bale. Preferably the plurality of sensors comprise moisture sensors. In a first illustrated embodiment (FIGS. 3 and 4), two sets of moisture sensors 34,36 are provided. Each set of moisture sensors 34,36 is located adjacent a respective end of the bar or aerofoil 32. It will be understood that the moisture sensors 34,36 will be connected to an electronic control unit 38 adapted to receive and process signals received from the moisture detectors 34,36. The electronic control unit 38 may be located on the round baler or in a vehicle towing the round baler.

Figure 6:
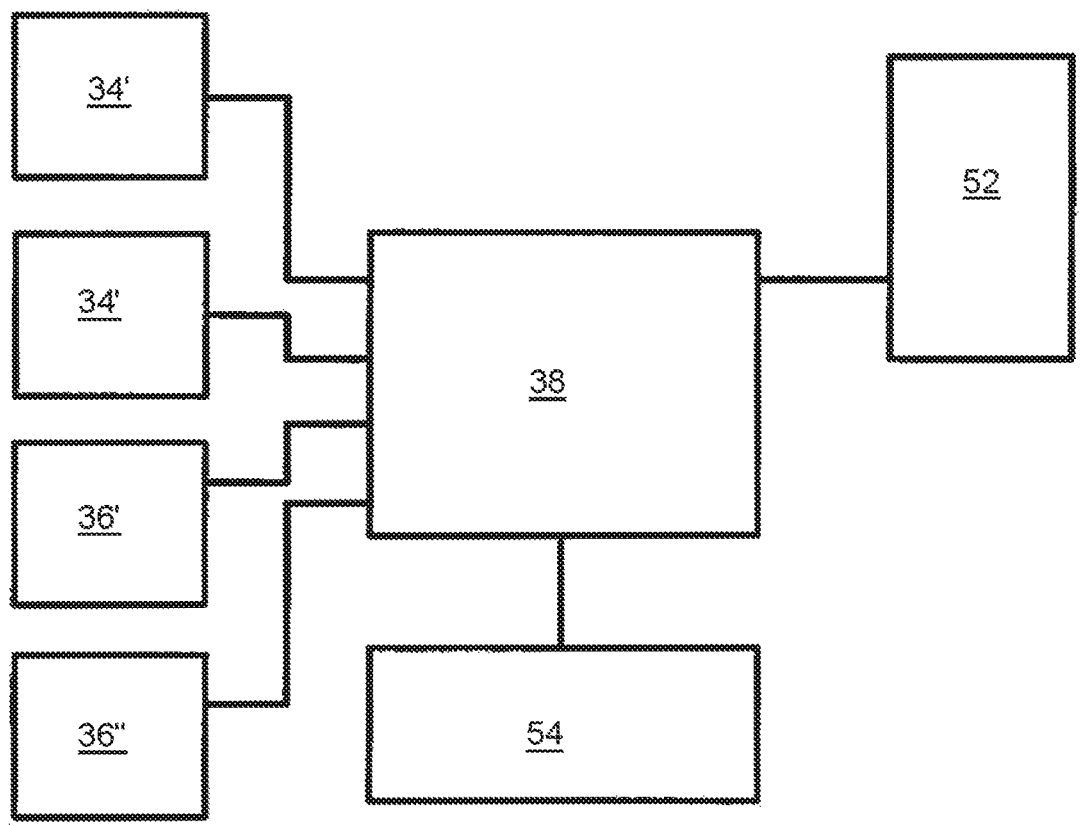
FIG. 6 shows a wrapped bale in combination with a second embodiment of the detection apparatus used in the present invention.
Figure 7:
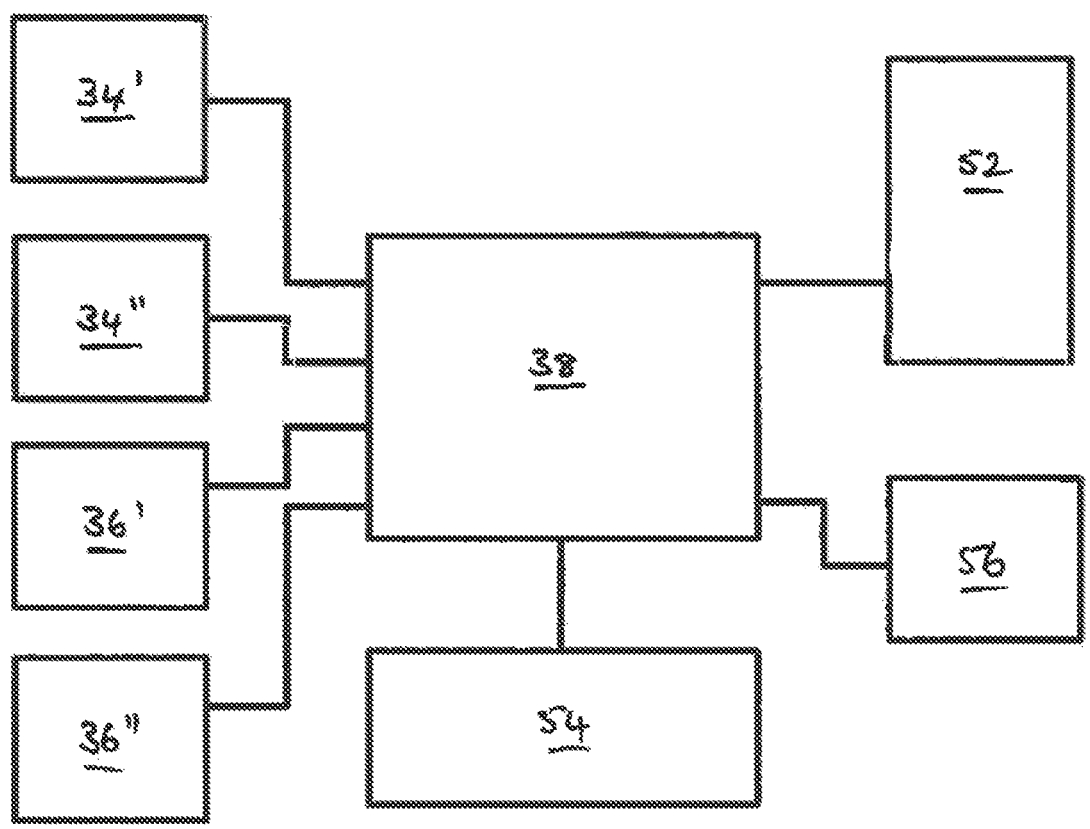
FIG. 7 shows a schematic of certain electrical aspects a system for use with the second embodiment of the present invention.
Figure 8:
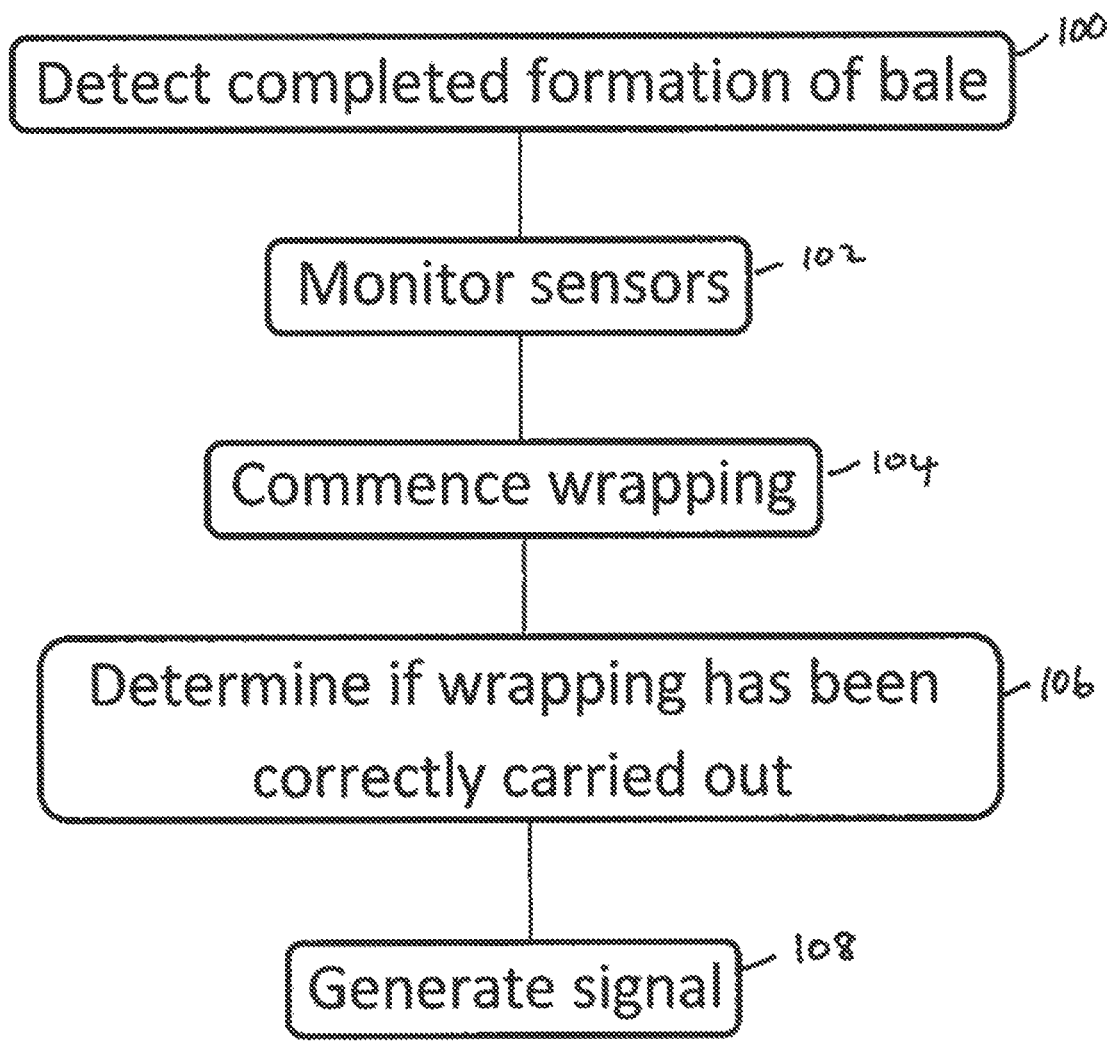
FIG. 8 shows a flow chart illustrating the steps of a preferred embodiment of the present invention.

In a second illustrated embodiment (FIG. 6), two sets of moisture sensors 34,36 are provided as in the first embodiment. At least one additional moisture sensor is provided in the vicinity of a flat side of the formed bale. In the second illustrated embodiment, one additional moisture sensor 56 is provided adjacent each flat side of the formed bale. It will be understood that the moisture sensor or sensors 56 will also be connected to the electronic control unit 38 (FIG. 7).

In each of the illustrated embodiments wrapping material 40 is pulled from a rotateably mounted supply reel 42 (or other wrapping material reservoir). Two pulling rollers 44,46 clamp the wrapping material 40 in a touching position positioned outside of the bale forming chamber Ch. One of the pulling rollers 44 is driven. The other pulling roller 46 is biased against the driven pulling roller 44. A wrapping material feeding roller 48 is located adjacent to the further pressing roller 22. A wrapping material inlet 50 is defined between the further processing roller 22 and the adjacent plurality of pressing belts 24.

In use, the conveyed crop material is directed through the crop material inlet and injected into the bale forming chamber Ch. The injected crop material is rotated by the pressing belts 24 to form a bale B. As further crop material is injected into the bale forming chamber Ch, the bale forming chamber Ch adopts a drum shape of increasing diameter within which the bale B continues to be formed under pressure.

During forming of the bale B at least one value indicative of the bale diameter is measured several times, for example the pivoting angle of the tensioning arm for the movable deflecting rollers or the pressure which the pressed bale B applies onto the or every pressing belt 24 or onto the pivotal tailgate (not shown). It is also possible to use a contactless distance sensor for measuring the bale diameter. After the bale B has reached a given diameter (step 100), the wrapping procedure is started (step 104) and the formed bale B is wrapped in the bale forming chamber Ch with a number of layers of the wrapping material (a net or a plastic foil) 40.

A loose end of the wrapping material 40 sags downwards between the pulling rollers 44, 46. Before starting the wrapping procedure a front edge of the wrapping material 40 is positioned at that position at which the wrapping material 40 will be severed once the bale B has been wrapped. To start the wrapping procedure, the pulling rollers 44,46 are set into rotation. The rotating pulling rollers 44,46 pull the wrapping material 40 from the supply reel 42. The loose end of the wrapping material 40 increases in length until it reaches a conveying surface of the rotating wrapping material feeding roller 48. The conveying surface comprises several longitudinal ribs and conveys the wrapping material 40 towards the wrapping material inlet 50.

The wrapping material 40 is inserted through the wrapping material inlet 50 into the bale forming chamber Ch. The inserted wrapping material 40 is then clamped between the rotating bale on the one side and by the pressing rollers 22,18,20 and later by the pressing belts 24 on the other. Preferably the wrapping material 40 is conveyed with a higher velocity after being inserted into the bale forming chamber Ch compared with a velocity achieved by the pulling rollers 44,46.

After the wrapping material 40 has been inserted into the bale forming chamber Ch and clamped, the pulling rollers 44,46 are set into an idler mode, e.g. by means of a clutch. The transfer of the pulling rollers 44,46 into the idler mode can be performed after a given time span has passed or after it has been detected that the wrapping material 40 is moving with the same velocity as the circumferential velocity of the bale B. The wrapping material 40 continues to be pulled from the supply reel 42. Several layers of wrapping material 40 are then wound around the circumferential surface S of the rotating bale B.

A brake shoe or other braking body can be moved into a position in which it decelerates the supply reel 42 and ensures a sufficient tension of the wrapping material 40 to ensure correct wrapping.

Preferably the length of the wrapping material 40 pulled from the supply reel 42 is measured, for example by counting the numbers of revolutions of one pulling roller 44,46 or of the supply reel 42. The required length of wrapping material 40 is determined by the required number of wrapping material layers and by the measured bale diameter.

After the formed bale B is wrapped by the required number of layers, the wrapping material 40 is severed at a severing position. This severing position is positioned between the pulling rollers 44,46 and the wrapping material feeding roller 48. After severing the wrapping material 40, a remaining wrapping material segment is kept in position and clamped by the pulling rollers 44,46 until the next bale is to be wrapped.

An ejection mechanism 54 may then be operated to open the tailgate and the wrapped bale ejected out of the bale forming chamber Ch and deposited onto the ground or onto a bale wrapping apparatus located behind the bale forming chamber Ch as appropriate.

In order to correctly wrap the formed bale B in the bale forming chamber Ch, it is required that the wrapping material 40 is properly inserted through the wrapping material inlet 50 into the bale forming chamber Ch and is wound around the circumferential surface S of the bale B. The entire width of the circumferential surface S of the bale B should be covered.

However, this might not happen for a number of reasons. The supply reel 42 can be empty. It is possible that the driven pulling roller 44 is not driven at all or does not start to pull the wrapping material at the proper time. The idler pulling roller 46 may not be biased sufficiently against the driven pulling roller 44 such that a high slippage between the rollers 44,46 and the wrapping material 40 occurs. It may happen that the supply reel 42 does not rotate but is blocked such that the wrapping material 40 cannot be pulled from the supply reel 42. Perhaps, the brake does not work properly and decelerates the supply reel 42 too strongly, in particular before the wrapping material 40 reaches the bale forming chamber Ch. It may happen that the wrapping material 40 does not reach the wrapping material inlet 50 but wraps around a pulling roller 44,46, the wrapping material feeding roller 48, a pressing roller 22,18,16 or around the conveying rotor 8. It is further possible that the wrapping material 40 is injected through the wrapping material inlet 50 into the bale forming chamber Ch but wraps around a starter roller 18,20 and does not reach the pressing belts 24. It is also possible that the wrapping material 40 is properly injected but is conveyed through the crop material inlet or through a nip between two rollers out of the bale forming chamber.

The wrapping material 40 may be torn, in particular after it has been clamped between the formed bale B and the pressing belts 24. It is further possible that the wrapping material 40 has shifted together such that it has insufficient width to extend across the circumferential face of the formed bale B.

It is an advantage of the invention that the result of each of these malfunctions may be automatically detected. It is a further advantage of the invention that no change to the amount of wrapping material 40 used is required. It is not necessary to use a specific kind of wrapping material 40. The invention does not restrict the kinds of loose material to be pressed into a bale B.

As noted, the wrapping procedure (step 104) is triggered once the formed bale B has reached a pre-determined diameter (step 100). In the first illustrated embodiment, the moisture detectors 34,36 detect a moisture level in the vicinity of the moisture detectors 34,36. In a preferred embodiment this occurs after detection of the formation of a completed bale and prior to wrapping of the formed bale (step 102). A change in moisture level may alternatively or additionally be used to determine the presence of a formed bale of suitable size adjacent the moisture detectors 34,36 in which case the sensors will monitor the moisture level prior to completion of the formed bale. In a further embodiment, the electronic control unit 38 compares the detected moisture levels only after the wrapping process has terminated.

A wrapped bale and an unwrapped bale present different moisture level characteristics (since the wrapping material at least partly prevents escape of moisture from the formed bale B). Accordingly, determining the moisture levels detected or, alternatively, a difference in moisture levels detected, serves as an indication of the degree of wrapping of the formed bale B.

Figure 4:
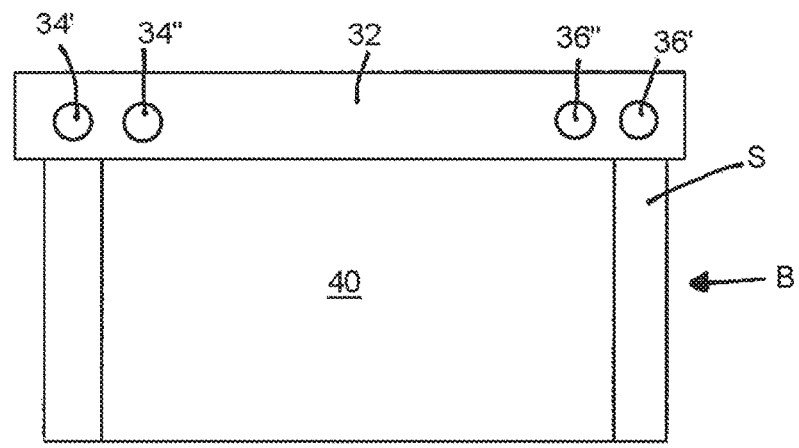
FIG. 4 shows a wrapped bale in combination with a first embodiment of the detection apparatus used in the present invention.
Figure 5:
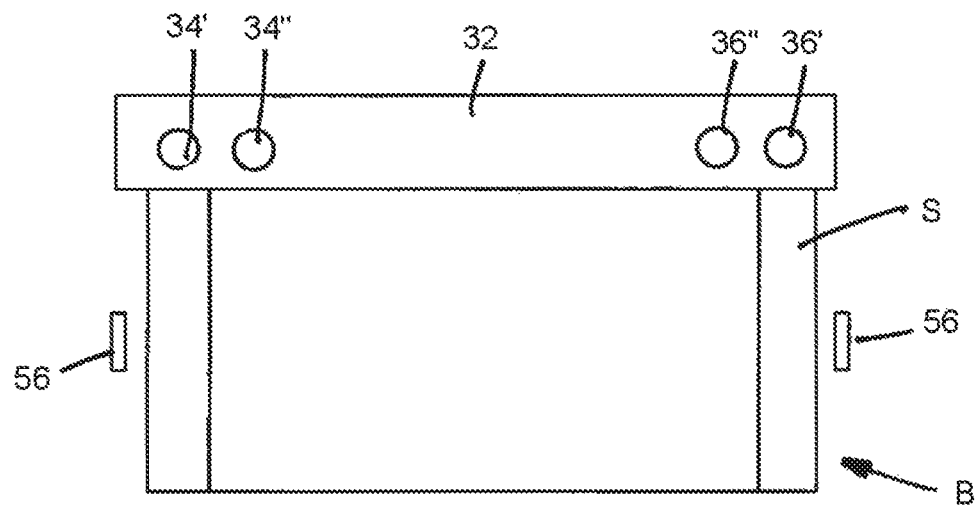
FIG. 5 shows a schematic of certain electrical aspects a system for use with the first embodiment of the present invention.

In the first illustrated embodiment, the two sets of moisture detectors 34,36 can be used to detect whether the wrapping material 40 extends to the edges of the formed bale B. In FIG. 4 the wrapping material 40 does not extend to the edges of the circumferential surface S of the formed bale B. In this case, the outermost moisture sensors 34',36' of each set of moisture sensors will detect a different moisture level to the inner moisture sensors 34",36". As a result the outermost moisture sensors 34",36" will return different signals to the electronic control unit 38 in comparison to the inner moisture sensors 34',36'. The electronic control unit 38 will interpret these different signals as indicating that the formed bale B is incorrectly wrapped (step 106).

In an alternative embodiment, not shown, moisture detectors may extend across the width of the bar or aerofoil 32, to detect whether the wrapping material 40 extends completely across the formed bale B from one edge to the other, for example to detect a tear in the wrapping material 40 within the width of the circumferential surface S of the formed bale B.

Once a determination of the success or otherwise of wrapping the bale has been made a suitable signal is generated to send an indication to the operator of the baling apparatus (step 108). In the event that incorrect wrapping of the formed bale B is detected, the electronic control unit 38 may send a signal, for example, to a display unit 52 in the towing vehicle to alert a user of the baler of the problem. The electronic control unit 38 may also generate signals to the ejection mechanism 54 to inhibit ejection of the incorrectly wrapped bale and to cause the display unit 52 to alert the user that ejection of the incorrectly wrapped bale is being inhibited. Further, where the baling apparatus forms part of a combination baler wrapper or the baling apparatus is in turn connected to a wrapping apparatus, the electronic control unit 38 may inhibit or otherwise operate to prevent ejection of the formed bale B from the bale forming chamber Ch so as to prevent undesirable release of loose crop material in the transfer mechanism between baling and wrapper apparatus.

In the second illustrated embodiment, the moisture detectors 34,36 again detect a moisture level in the vicinity of the moisture detectors 34,36. The moisture sensor or sensors 56 also detect a moisture level in the vicinity of the moisture sensor or sensors 56. The moisture sensor or sensors 56 serve to provide a reference value for a moisture level in a region of the bale known not to be covered with wrapping material. A comparison of the readings returned from the moisture detectors 34,36 with the reference value returned from the moisture sensor or sensors 56 will allow the central control unit 38 to determine whether the moisture detectors 34,36 are providing an indication whether the formed bale B in the vicinity of each of the moisture detectors 34,36 is suitably wrapped.

In each embodiment, the electronic control unit 38 can then provide a suitable signal to the operator, for example to indicate that that the wrapping operation has been properly completed and that the bale may be or has been ejected or, alternatively, to indicate that the bale has not been properly wrapped and that ejection of the bale has been prevented.

Conveniently management of the various signals may be integrated into an ISOBUS data management system linking the towing and towed vehicles.

From reading the present disclosure, other modifications will be apparent to persons skilled in the art. Such modifications may involve other features which are already known in the field of balers and wrapping apparatus and component parts thereof and which may be used instead of or in addition to features already described herein.

The invention claimed is:

1. A baling apparatus comprising:
a bale forming chamber in which an agricultural bale is formed and subsequently released, the bale forming chamber defined between a feeding channel in a front part of the baling apparatus, a first side of the baling apparatus, and a second side of the baling apparatus opposite the first side as the baling apparatus moves in a traveling direction;
a release apparatus to control release of the agricultural bale from the bale forming chamber;
a wrapping apparatus for introducing a wrapping material into the bale forming chamber and wrapping an at least one circumferential surface of a formed agricultural bale with the wrapping material;
a support extending adjacent the bale forming chamber, the support comprising a plurality of moisture sensors arranged upon the support so as to be positioned adjacent the formed agricultural bale after the formed agricultural bale is wrapped by the wrapping apparatus, wherein a first moisture sensor of the plurality of moisture sensors is positioned closer to the first side of the baling apparatus than a second moisture sensor of the plurality of moisture sensors, wherein the sensors are configured to measure a moisture level of the at least one circumferential surface of the formed agricultural bale; and
a controller which receives signals from the plurality of moisture sensors and to controls the release apparatus if the signals from the plurality of moisture sensors indicate that the formed bale was improperly wrapped by the wrapping apparatus such that the wrapping material fails to extend to where the first moisture sensor is positioned closer to the first side.

2. The baling apparatus of claim 1, wherein the plurality of moisture sensors are divided into two groups, with one of the two groups disposed toward a first end of the support at the first side of the baling apparatus and a second of the two groups is disposed toward a second end of the support at the second side of the baling apparatus.

3. The baling apparatus of claim 2, wherein each of the two groups of sensors comprises two sensors.

4. The baling apparatus of claim 1, further comprising at least one additional sensor configured to measure a property of an unwrapped surface of the formed agricultural bale.

5. The baling apparatus of claim 4, wherein the at least one additional sensor is a moisture sensor and the property is moisture and the controller receives an additional signal from the additional sensor and compares the additional signal with the signals from the plurality of moisture sensors to determine if the formed bale was properly wrapped by the wrapping apparatus.

6. A method of operating the baling apparatus of claim 1, comprising:
gathering loose crop material from a ground surface;
transferring the loose crop material to the baling apparatus;
forming an agricultural bale within the bailing apparatus;
wrapping the formed agricultural bale within the baling apparatus;
measuring a moisture level of a surface of the formed agricultural bale using the plurality of moisture sensors;
determining from the measurement of the moisture level of the surface of the formed agricultural bale whether the formed agricultural bale is properly wrapped; and
determining whether to release the formed agricultural bale from the baling apparatus.

7. The method of operating a baling apparatus of claim 6, further comprising:
measuring the moisture level of the formed agricultural bale using at least one additional moisture sensor; and
comparing the moisture level of the surface of the formed agricultural bale measured using the at least one additional moisture sensor to the moisture level measured using the plurality of moisture sensors to determine whether the formed agricultural bale is properly wrapped and whether to release the formed agricultural bale from the baling apparatus.

8. A baling apparatus comprising:
a bale forming chamber for forming an agricultural bale, the bale forming chamber defined between a feeding channel in a front part of the baling apparatus, a first side of the baling apparatus, and a second side of the baling apparatus opposite the first side as the baling apparatus moves in a traveling direction;
a wrapping apparatus for wrapping at least one circumferential surface of a formed agricultural bale with a wrapping material;
a support extending adjacent the bale forming chamber; and
a plurality of moisture sensors disposed upon the support, wherein the sensors are configured to measure a moisture level of the at least one circumferential surface of the formed agricultural bale after the formed bale is wrapped with the wrapping material by the wrapping apparatus;
at least one additional moisture sensor oriented and configured to measure another moisture level of an unwrapped side-facing portion of the formed agricultural bale, the side-facing portion facing outward towards one of the first or second sides of the baling apparatus; and
an electronic control unit that is configured to receive the measured moisture level of the at least one circumferential surface of the formed agricultural bale from the plurality of moisture sensors and the measured moisture level of the unwrapped side-facing portion of the formed agricultural bale from the at least one additional moisture sensor.

9. The baling apparatus of claim 8, wherein the electronic control unit is further configured to compare the measured moisture level of the at least one circumferential surface of the formed agricultural bale and the measured moisture level of the unwrapped side-facing portion of the formed agricultural bale to determine whether the formed agricultural bale is properly wrapped.

10. The baling apparatus of claim 8, wherein the electronic control unit is further configured to compare a first measured moisture level of the at least one circumferential surface of the formed agricultural bale received from a first moisture sensor of the plurality of moisture sensors and a second measured moisture level of the at least one circumferential surface of the formed agricultural bale received from a second moisture sensor of the plurality of moisture sensors to determine whether the formed agricultural bale is properly wrapped.

11. The baling apparatus of claim 10, wherein the electronic control unit is further configured to, responsive to a determination that the first measured moisture level of the at least one circumferential surface of the formed agricultural bale is different from the second measured moisture level of the at least one circumferential surface of the formed agricultural bale, determine that the agricultural bale is improperly wrapped.

12. The baling apparatus of claim 10, wherein the electronic control unit is further configured to, responsive to a determination that the first measured moisture level of the at least one circumferential surface of the formed agricultural bale is at least substantially the same as the second measured moisture level of the at least one circumferential surface of the formed agricultural bale, determine that the agricultural bale is properly wrapped.

13. The baling apparatus of claim 8, wherein the electronic control unit is further configured to, responsive to a determination that the formed agricultural bale is properly wrapped, permit the formed agricultural bale to be ejected from the baling apparatus.

14. The baling apparatus of claim 8, wherein the electronic control unit is further configured to, responsive to a determination that the formed agricultural bale is improperly wrapped, prevent the formed agricultural bale from be ejected from the baling apparatus.

15. The baling apparatus of claim 8, wherein the electronic control unit is further configured to, responsive to a determination that the formed agricultural bale is properly wrapped, cause an indication that the formed agricultural bale may be ejected from the baling apparatus to be displayed on a display of a towing vehicle.

16. The baling apparatus of claim 8, wherein the electronic control unit is further configured to, responsive to a determination that the formed agricultural bale is improperly wrapped, cause an alert that the formed agricultural bale is improperly wrapped to be displayed on a display of a towing vehicle.

* * * * *